(12) United States Patent
Venkataraman et al.

(10) Patent No.: US 8,948,051 B2
(45) Date of Patent: Feb. 3, 2015

(54) SYSTEM AND METHOD FOR EFFICIENT MVPN SOURCE REDUNDANCY WITH S-PMSI

(71) Applicants: Srikrishnan Venkataraman, Sunnyvale, CA (US); Pradeep G Jain, Sunnyvale, CA (US); Kanwar D Singh, Mountain View, CA (US); Jaishal Shah, Mountain View, CA (US)

(72) Inventors: Srikrishnan Venkataraman, Sunnyvale, CA (US); Pradeep G Jain, Sunnyvale, CA (US); Kanwar D Singh, Mountain View, CA (US); Jaishal Shah, Mountain View, CA (US)

(73) Assignee: Alcatel Lucent, Boulogne-Billancourt (FR)

( * ) Notice: Subject to any disclaimer, the term of this patent is extended or adjusted under 35 U.S.C. 154(b) by 115 days.

(21) Appl. No.: 13/623,172

(22) Filed: Sep. 20, 2012

(65) Prior Publication Data
US 2013/0322291 A1  Dec. 5, 2013

Related U.S. Application Data

(60) Provisional application No. 61/653,219, filed on May 30, 2012.

(51) Int. Cl.
*H04L 12/28* (2006.01)

(52) U.S. Cl.
USPC .......................................... 370/254

(58) Field of Classification Search
USPC ......... 370/229, 230, 235, 241, 254, 252, 351, 370/389, 400, 432
See application file for complete search history.

(56) References Cited

U.S. PATENT DOCUMENTS

| | | | |
|---|---|---|---|
| 2011/0280123 A1* | 11/2011 | Wijnands et al. | 370/228 |
| 2012/0099422 A1* | 4/2012 | Liu et al. | 370/221 |
| 2013/0107699 A1* | 5/2013 | Miclea | 370/228 |

* cited by examiner

Primary Examiner — Anh Ngoc Nguyen
(74) Attorney, Agent, or Firm — Wall & Tong, LLP

(57) ABSTRACT

A system, method and apparatus for source redundant MVPN in which a number of Interface Indices is reduced by leaf node Incoming Label Maps (ILM) including one or more Interface Indices common to multiple tunnels.

19 Claims, 4 Drawing Sheets

SYSTEM AND METHOD FOR EFFICIENT MVPN SOURCE REDUNDANCY WITH S-PMSI

CROSS REFERENCE TO RELATED APPLICATIONS

This application claims the benefit of U.S. Provisional Patent Application Ser. No. 61/653,219, filed May 30, 2012, entitled TE-LSP SYSTEMS AND METHODS which application is incorporated herein by reference in its entirety.

FIELD OF THE INVENTION

The invention relates generally to communication networks and, more specifically but not exclusively, to traffic path management in communication networks supporting multicast services.

BACKGROUND

Multi-Protocol Label Switching (MPLS) Label Distribution Protocol (LDP) enables peer label switch routers (LSRs) in an MPLS network to exchange label binding information for supporting hop-by-hop forwarding in an MPLS network. Within the context of next generation multicast virtual private networks (NG-MVPNs), to receive a multicast traffic over a MPLS/LDP transport tunnel at a leaf node, Protocol Independent Multicast (PIM) follows Reverse Path Forwarding (RPF) procedures and programs <source, group> (S, G) records with indices which represent the transport tunnel on which traffic is expected. For a given (S, G) record at a leaf node, RPF indices determine which transport tunnel interfaces are going to be used in order to receive traffic.

In current Selective Provider Multicast Service Interface (S-PMSI) implementations for NG-MVPNs with MPLS as transport, each of the SG records at a leaf node for a path (S,G) belonging to a single MVPN stores the following data: (1) Root PE's I-PMSI index as RPF-Primary index; (2) Root PE's S-PMSI index as RPF-Secondary index; and (3) the Rendezvous Point's (RP's) I-PMSI as RPF-RP index. This data, which is stored in three RPF indices at the leaf node, helps in lossless SPT switch from (*, G), lossless transition from I-PMSI to S-PMSI and vice versa.

In current Source Redundancy implementations for NG-MVPNs with MPLS as transport, each of the SG records at a leaf node for a path (S,G) belonging to a single MVPN stores the following data: (1) I-PMSI Index from Primary Source as RPF-Primary index; (2) I-PMSI Index from Secondary Source as RPF-Secondary index; and (3) RP PE's I-PMSI as RPF-RP index. This data, which is stored in three RPF indices at the leaf node, helps in providing a fast switch from a Primary Source Tunnel to a Secondary Source Tunnel in case of Primary Tunnel failure, thereby minimizing the traffic loss at the leaf node.

To implement Source Redundancy with the context of the selective provider multicast service interface (S-PMSI) Model, the above implementations are used together, which requires that five indices be maintained and programmed in order to achieve the benefits of both the models; namely, (1) inclusive provider multicast service interface (I-PMSI) Index from the primary source; (2) S-PMSI Index from the primary source; (3) I-PMSI Index from the secondary source; (4) S-PMSI Index from the secondary source; and (5) I-PMSI index from the RP. This implementation is very expensive and undesirable from both a data plane perspective and a control plane perspective.

SUMMARY

Various deficiencies in the prior art are addressed by systems, methods and apparatus for source redundant MVPN in which a number of Interface Indices is reduced by leaf node Incoming Label Maps (ILM) including one or more Interface Indices common to multiple tunnels.

In various embodiments, a leaf node Incoming Label Maps (ILM) including an Interface Index common to each of a primary PE I-PMSI tunnel and a primary PE S-PMSI tunnel, or each of a secondary PE I-PMSI tunnel and a secondary PE S-PMSI tunnel, or each of a primary PE I-PMSI tunnel and a secondary PE I-PMSI tunnel.

One embodiment is a method for providing Multicast Virtual Private Network (MVPN) source redundancy, the method comprising configuring a leaf node to use a first logical interface to receive data associated with a multicast channel from each of a Primary Source I-PMSI tunnel and a Primary Source S-PMSI tunnel; and configuring the leaf node to use a second logical interface to receive data associated with the multicast channel from each of a Secondary Source I-PMSI tunnel and a Secondary Source S-PMSI tunnel.

BRIEF DESCRIPTION OF THE DRAWINGS

The teachings herein can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The invention will be discussed within the context of source redundancy S-PMSI based MVPN implementations providing lossless transitions between Primary Source PE I-PMSI and S-PMSI, Secondary Source S-PMSI to I-PMSI and SPT switch in which only three indices are used. These embodiments also preserve fast failover capability from Primary Source to Secondary Source in S-PMSI based MVPNs Various embodiments contemplate that each of an I-PMSI tunnel and a S-PMSI tunnel from a root PE is represented at a leaf node by an Incoming Label Map (ILM) record. The ILM record contains an Interface Index for identifying the logical input interface associated with the tunnel (i.e., the logical interface that the tunnel is arriving on at the leaf node). The ILM maps each incoming label to a set of Next Hop Label Forwarding Entries (NHLFEs).

The Interface Index is managed for transport protocol (MPLS/LDP). In order to efficiently implement source redundancy with S-PMSI based MVPNs, the interface index in the ILM record for both I-PMSI and S-PMSI corresponding to a <root, mvpn> is made or constrained to be the same. This interface index, which is common for the I-PMSI tunnel and S-PMSI tunnel, needs to be communicated to PIM. PIM uses this interfaces index as RPF index and programs the (S, G) record. The (S, G) record for a particular MVPN at the leaf is programmed as:

(1) Interface Index of I-PMSI and S-PMSI from Primary Source PE as RPF-Primary Index;

(2) Interface Index of I-PMSI and S-PMSI from Secondary Source PE as RPF-Secondary Index; and (3) Interface Index of I-PMSI from RP PE as RPF-RP Index. In this manner, source redundancy can be achieved even with S-PMSI based MVPNs with just 3 indices.

Figure 1:
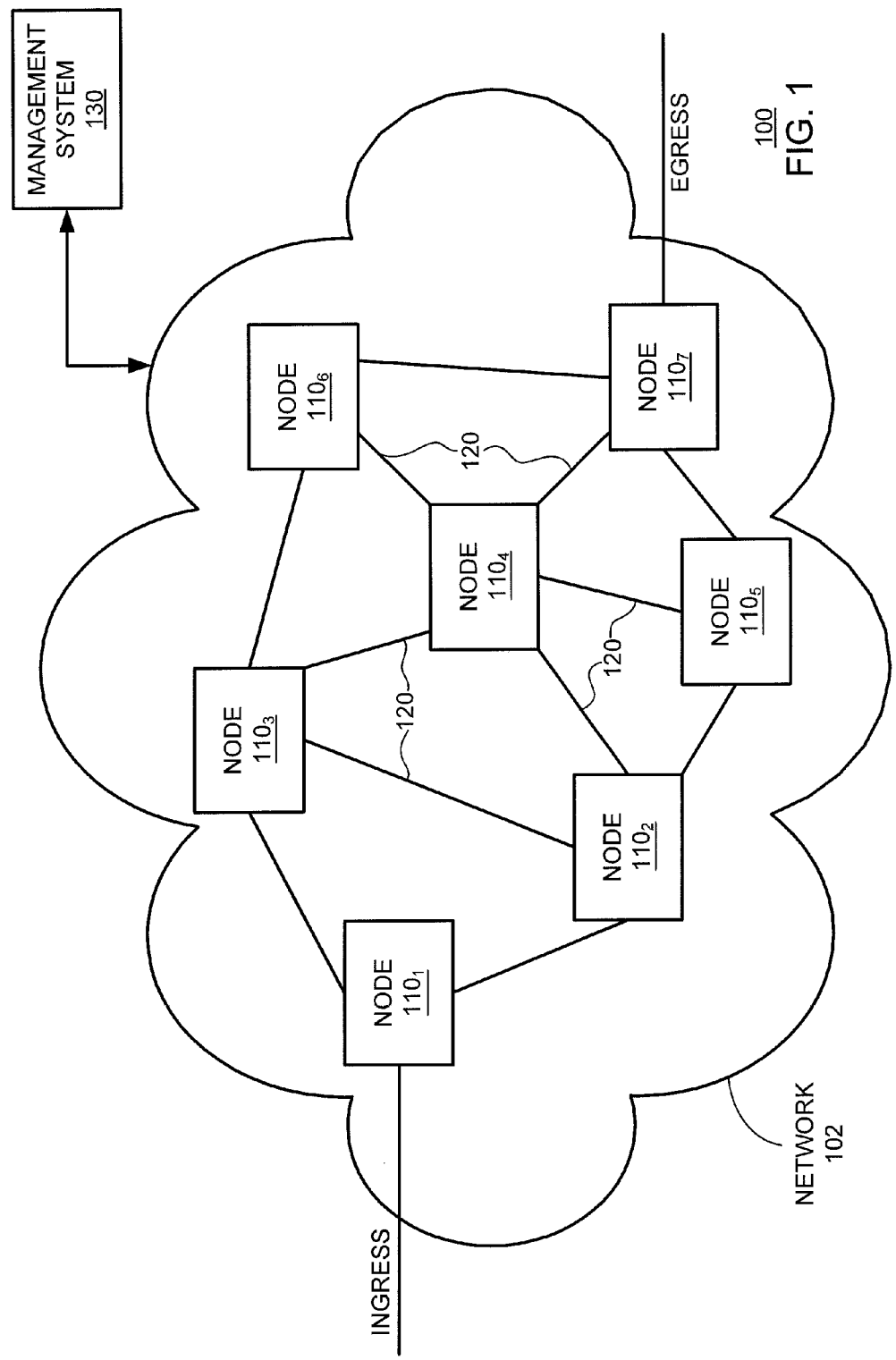
FIG. 1 depicts a high-level block diagram of a system benefiting from various embodiments.

FIG. 1 depicts a high-level block diagram of a system benefiting from various embodiments.

As depicted in FIG. 1, exemplary system 100 includes a network 102, which includes seven nodes $110_1$-$110_7$ (collectively, nodes 110) that are interconnected via a plurality of communication links 120 (collectively, communication links 120). The network 102 is managed by a management system 130, which may provide any suitable management functions for network 102.

The network 102 may be any suitable type of network and, thus, the nodes 110 may be any suitable types of nodes. For example, the network 102 may be an MPLS network in which nodes 110 are label switching routers (LSRs).

The nodes 110 are configured for transporting traffic within the network 102. The nodes 110 may transport traffic within network 102 using any suitable protocols (e.g., Internet Protocol (IP), MPLS, and the like, as well as various combinations thereof).

The nodes 110 are configured to collect link state information associated with the communication link(s) 120 to which each node 110 is connected. The nodes 110 are further configured to flood the collected link state information within network 102. The collection and flooding of link state information may be performed in any suitable manner, e.g., using an Interior Gateway Protocol (IGP) supporting link-state, such as Open Shortest Path First (OSPF), Intermediate System to Intermediate System (ISIS), or any other suitable protocol. In this manner, each node 110 receives link state information associated with network 102 and, thus, each node 110 is able to maintain a database including information suitable for use in computing paths (e.g., network topology information, link state information, and the like). This type of database is typically referred to as a Traffic Engineering (TE) database. The processes for exchanging such information and for maintaining such databases will be understood by one skilled in the art.

The nodes 110 also may be configured to store link constraints for use in computing paths for network 102.

The link constraints may include any suitable link constraints which may be evaluated within the context of path computation. For example, the link constraints may include one or more of a link utilization for the link, a minimum link capacity required for a link, a maximum link bandwidth allowed for a link, a link cost associated with a link, an administrative constraint associated with the link, and the like, as well as various combinations thereof.

The link constraints may be configured on the nodes 110 in any suitable manner. For example, the link constraints may be pre-configured on the nodes 110 (e.g., automatically and/or by administrators), specified when requesting path computation or establishment, and the like, as well as various combinations thereof. In such embodiments, the link constraints may be provided to the nodes 110, for storage on the nodes 110, from any suitable source(s) of link constraints (e.g., a management system such as MS 130, or any other suitable source).

Although primarily depicted and described herein with respect to embodiments in which link constraints are configured on the nodes 110, in other embodiments the link constraints may not be stored on the nodes 110. For example, in embodiments in which path computation is performed by a device or devices other than nodes 110 (e.g., by a management system, such as MS 130), link constraints may only be available to the device(s) computing the paths.

In network 102, at least a portion of the nodes 110 may be configured to operate as ingress nodes into network 102 and, similarly, at least a portion of the nodes 110 may be configured to operate as egress nodes from network 102. In FIG. 1, for example, for a given path between node $110_1$ and node $110_7$, node $110_1$ operates as an ingress node for the path and node $110_7$ operates as an egress node for the path. It will be appreciated that each of the nodes 110 may operate as an ingress node only, an egress node only, or both an ingress and egress node (e.g., for different traffic flows).

As each of the nodes 110 may be configured to operate as an ingress node and/or as an egress node, each node 110 configured to operate as an ingress node may be referred to as an ingress node 110 and each node 110 configured to operate as an egress node may be referred to as an egress node 110.

In one embodiment, the ingress nodes 110 each are configured for computing paths to egress nodes 110, thereby enabling establishment of connections, from the ingress nodes 110 to the egress nodes 110, configured for transporting traffic via the network 102. The ingress nodes 110, in response to path computation requests, compute the requested paths based on the network information (e.g., network topology, link state, and the like, which may be available in a TE database and/or any other suitable database or databases) and link constraints available to the ingress nodes 110, respectively. The ingress nodes 110, upon computation of paths, may then initiate establishment of connections using the computed paths. The ingress nodes 110 may then transmit information to the egress nodes 110 via the established connections, at which point the egress nodes 110 may then forward the information to other networks and devices.

In one embodiment, MS 130 is configured for computing paths from ingress nodes 110 to egress nodes 110, thereby enabling establishing of connections, from the ingress nodes 110 to the egress nodes 110, configured for transporting traffic via the network 102. The MS 130, in response to path computation requests, computes the requested paths based on the network information (e.g., network topology, link state, and the like, which may be available in a TE database and/or any other suitable database or databases) and link constraints available to MS 130. The MS 130, upon computing a path, transmits path configuration information for the computed path to the relevant nodes 110, where the path configuration information may be used to establish a connection via the computed path within network 102. The ingress node 110 of the computed path may then transmit information to the egress node 110 via the connection, at which point the egress node 110 may then forward the information to other networks and devices.

In various embodiments, the network 102 comprises an MPLS network in which nodes 110 are label switching routers (LSRs) operating according to Multi-Protocol Label Switching (MPLS) Label Distribution Protocol (LDP).

For illustrative purposes, it will be assumed that various nodes 110 may comprise leaf nodes or multicast nodes communicating with respective subscriber, client or other devices (not shown) using Internet Group Management Protocol (IGMP) to establish multicast group memberships. Similarly, various nodes 110 may operate as ingress nodes or remote multicast routers communicating with the leaf nodes, multicast nodes or local multicast routers using Protocol Independent Multicast (PIM) to direct multicast traffic from the multicast server (e.g., ingress node or other node) to many multicast clients.

In one embodiment, to receive multicast traffic over a MPLS/LDP transport tunnel at a leaf node, Protocol Independent Multicast (PIM) follows Reverse Path Forwarding (RPF) procedures and programs <source, group> (S, G) records with indices which represent the transport tunnel on which traffic is expected. For a given (S, G) record at a leaf node, RPF indices determine which transport tunnel interfaces are going to be used in order to receive traffic.

A leaf node may be connected to a many client devices via, illustratively, one or more L2 switches or other devices using Internet Group Management Protocol (IGMP) or another protocol. The leaf node is configured to support MPLS tunnels delivering channels or MVPN streams from a primary root and a secondary root. When the leaf node receives an IGMP join from a client device (indicative of a client desire to join a particular multicast channel), the leaf node learns the source of the multicast channel from the primary and secondary roots.

Figure 2:
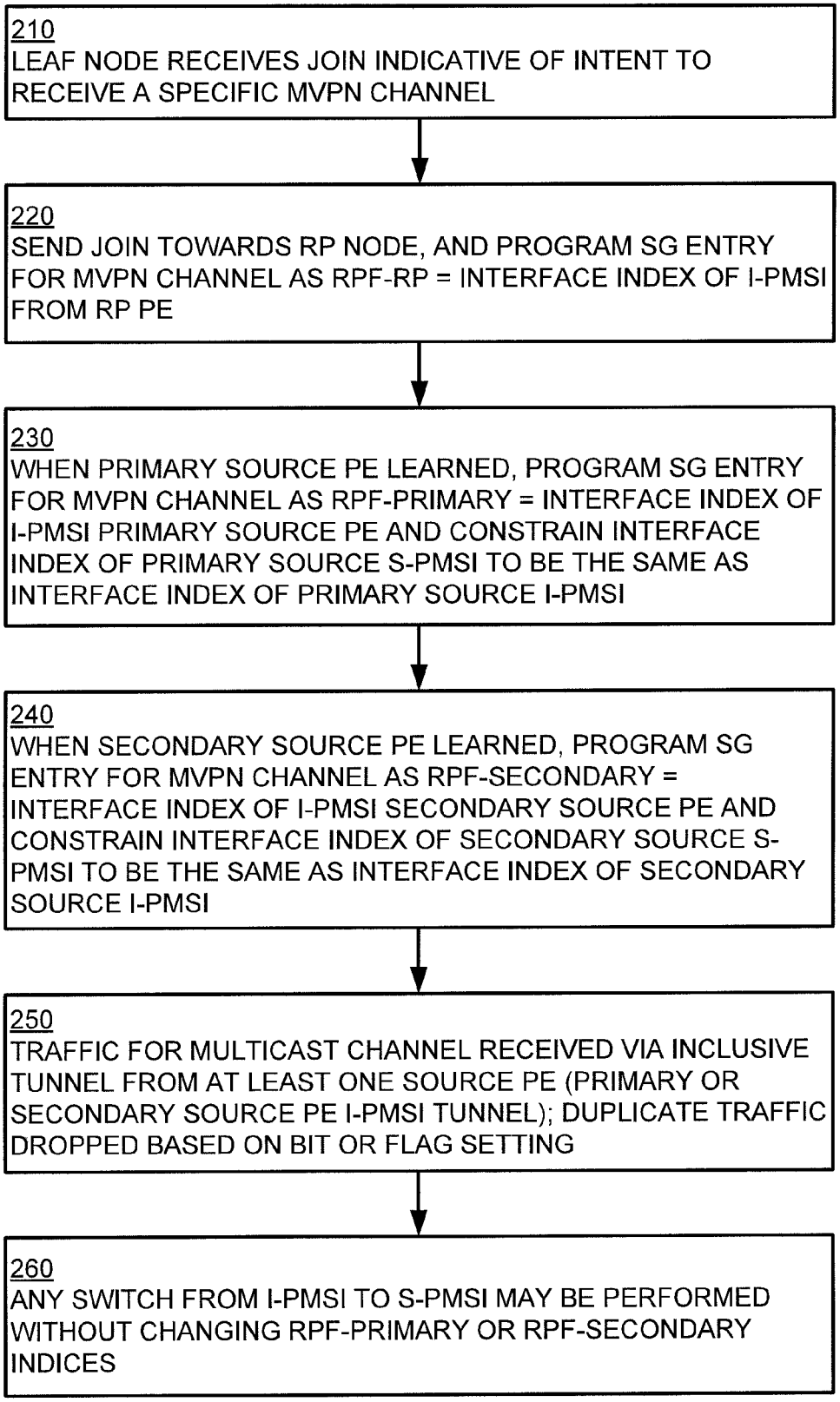
FIG. 2 depicts a flow diagram of a method according to one embodiment.

FIG. 2 depicts a flow diagram of a method according to one embodiment. Specifically, FIG. 2 depicts a flow diagram of a method in which only three RPF indices are necessary to support MVPN multicast traffic to a requesting subscriber or client via either of a Primary Source provider edge (PE) node and a Secondary Source PE node, where one or both of the primary and secondary sources use S-PMSI in addition to I-PMSI.

At step 210, a leaf node receives a join request from a requesting subscriber, client or other device served by the leaf node indicative of the desire of a subscriber or client device to receive a certain multicast channel. Referring to box 215, the join may comprise, illustratively an IGMP *g, shared join or some other indication of a desire to receive a specific multicast channel from any possible source).

At step 220, the leaf node sends the join (e.g., IGMP *g or shared join) towards a Rendezvous Point (RP) node or PE, and programs its router/hardware via an SG entry setting RPF-RP as the Interface Index of the I-PMSI tunnel from the RP PE (i.e., the MPLS tunnel that originated from the Rendezvous Point node or PE).

That is, an (S, G) record for the multicast or MVPN channel is created or programmed such that the RPF-RP Index is programmed with the Interface Index of I-PMSI tunnel from the RP PE.

Generally speaking, the leaf node (or other receivers) initially joins the MVPN or multicast stream via the shared tree rooted a the Rendezvous Point (RP) node.

As the leaf node (or other receivers) learn the identity of the primary source of the MVPN or multicast stream, they join the tree rooted at the primary source (the primary shortest-path tree or SPT) and then send a prune message to the RP to stop the traffic coming through the RP shared tree for the group that they joined.

Similarly, as the leaf nodes (or other receivers) learn the identity of a secondary source of the MVPN or multicast stream, they may join the tree rooted at the secondary source (the secondary shortest-path tree or SPT) in the event of a primary source failure, or for load balancing purposes and the like. The leaf nodes (or other receivers) may also send a prune message to the primary source to stop the traffic coming through the primary source shared tree for the group that they joined.

At step 230, when a Primary Source PE or root node associated with the MVPN or multicast channel is learned, the leaf node programs its router/hardware via an SG entry setting RPF-Primary as the Interface Index of the I-PMSI tunnel from the Primary Source PE, and constrains the Interface Index of any Primary Source S-PMSI tunnel to be the same as interface index of the Primary Source I-PMSI tunnel (i.e., if a S-PMSI tunnel is used). In particular, updating the SG entry on the leaf node with the RPF-Primary provides an ability to transition MVPN or multicast channel traffic from the RP-Tree to the primary-source-tree.

That is, an (S, G) record for the multicast or MVPN channel is created or programmed such that the RPF-Primary Index is programmed with the Interface Index of the I-PMSI tunnel from the Primary Source PE. Further, if a S-PMSI tunnel from the Primary Source PE is used, then the Interface Index of the Primary Source S-PMSI tunnel is constrained or set to be the same as the Interface Index of the Primary Source I-PMSI tunnel.

Therefore, any switching from the Primary Source PE I-PMSI tunnel to the Primary Source PE S-PMSI tunnel will use the same Interface Index (i.e., logical interface) at the leaf node. In this manner, a single Interface Index may be stored rather than two duplicate indices (i.e., one for each of the I-PMSI and S-PMSI Primary Source PE tunnels).

At step 240, when a Secondary Source PE or root node associated with the MVPN or multicast channel is learned, the leaf node programs its router/hardware via an SG entry setting RPF-Secondary as the Interface Index of the I-PMSI tunnel from the Secondary Source PE, and constrains the Interface Index of any Secondary Source S-PMSI tunnel to be the same as interface index of the Secondary Source I-PMSI tunnel (i.e., if a S-PMSI tunnel is used). In particular, updating the SG entry on the leaf node with the RPF-Secondary provides an ability to transition MVPN or multicast channel traffic from the primary-source-tree to the secondary-source-tree.

That is, an (S, G) record for the multicast or MVPN channel is created or programmed such that the RPF-Secondary Index is programmed with the Interface Index of the I-PMSI tunnel from the Secondary Source PE. Further, if a S-PMSI tunnel from the Secondary Source PE is used, then the Interface Index of the Secondary Source S-PMSI tunnel is constrained or set to be the same as the Interface Index of the Secondary Source I-PMSI tunnel.

Therefore, any switching from the Secondary Source PE I-PMSI tunnel to the Secondary Source PE S-PMSI tunnel will use the same Interface Index (i.e., logical interface) at the leaf node. In this manner, a single Interface Index may be stored rather than two duplicate indices (i.e., one for each of the I-PMSI and S-PMSI Secondary Source PE tunnels).

With respect to steps 220-240, the leaf node (or other receivers) initially join the MVPN or multicast stream via the shared tree rooted a the Rendezvous Point (RP) node (step 220). At this time the only MVPN traffic is via the RP node using the RPF-RP Index.

As the leaf node (or other receivers) learn the identity of the primary source of the MVPN or multicast stream, they join the tree rooted at the primary source (the primary shortest-path tree or SPT) and then send a prune message to the RP to stop the traffic coming through the RP shared tree for the group that they joined. At this time, the MVPN or multicast channel traffic is conveyed via the Primary-Source PE node using the RPF-Primary Index.

As the leaf node (or other receivers) learn the identity of a secondary source of the MVPN or multicast stream, they join the tree rooted at the secondary source (the secondary shortest-path tree or SPT). To provide redundancy, there is no prune message sent to the Primary-Source PE node. Thus, at this time the MVPN or multicast channel traffic is conveyed via both the Primary-Source PE node using the RPF-Primary Index and the Secondary-Source PE node using the RPF-Secondary Index.

At step 250, traffic for the MVPN or multicast channel is received by the leaf node (and other nodes) via Inclusive Tunnel from at least one source PE (Primary or Secondary Source PE I-PMSI tunnel(s)) and routed to respective subscriber or client devices as appropriate. Based on a bit setting, flag setting or other mechanism at the leaf node, traffic from either the primary or secondary tunnels is accepted, while traffic from the other tunnel is dropped.

At step 260, Any Switch from I-PMSI to S-PMSI for either of the primary or secondary traffic flows may be performed without changing RPF-Primary or RPF-Secondary Indices. This is because the ILM records for the Primary Source PE I-PMSI and S-PMSI tunnels use a first common Interface Index, and the ILM records for the Secondary Source PE I-PMSI and S-PMSI tunnels use a second common Interface Index as described above.

Generally speaking, each I-PMSI and S-PMSI tunnel from a root PE is represented by Incoming Label Map (ILM) record at the leaf node. This record contains an interface index that represents the logical interface that the tunnel is arriving on.

This interface Index is managed for transport protocol (MPLS/LDP). In order to efficiently implement source redundancy with S-PMSI based MVPNs, in various embodiments the interface index in the ILM record for both I-PMSI and S-PMSI corresponding to a <root, mvpn> is the same.

This interface index which is common for the I-PMSI and S-PMSI is communicated to PIM. PIM uses this interfaces index as RPF index and programs the (S, G) record. The (S, G) record for a particular MVPN at the leaf programmed as follows:

Interface Index of I-PMSI and S-PMSI from Primary Source PE as RPF-Primary Index Interface Index of I-PMSI and S-PMSI from Secondary Source PE as RPF-Secondary Index Interface Index of I-PMSI from RP PE as RPF-RP Index In this manner, source redundancy is achieved even with S-PMSI based MVPNs with just 3 indices. Table 1 below illustrates PIM SG record programming in various examples.

TABLE 1

| SG State | RPF-Primary | RPF-Secondary | RPF-RP |
|---|---|---|---|
| SG before SPT switch | | | RP-I-PMSI Index |
| SG after SPT Switch without S-PMSI | Primary-PE-I-PMSI Index | Secondary-PE I-PMSI Index | |
| SG after SPT with S-PMSI | Could be one of below: Primary-PE-I-PMSI Index Primary-PE-I-PMSI Index Primary-PE-S-PMSI Index Primary-PE-S-PMSI Index | Could be one of below: Secondary-PE-I-PMSI Index Secondary-PE-S-PMSI Index Secondary-PE-I-PMSI Index Secondary-PE-S-PMSI Index | |

In various embodiments, one or both of the RFP-Primary and RFP-Secondary may be set to, respectively, Primary-PE-S-PMSI and Secondary-PE-S-PMSI Indices, though these indices may simply point to the same logical interfaces associated with the I-PMSI Indices.

Generally speaking, both sources send traffic to the leaf via their respective I-PMSI tunnels. The leaf node hardware is programmed to accept the traffic from either one of the sources using a bit, flag or other mechanism.

When the Primary Source tunnel is functioning properly, the traffic from the Secondary Source is dropped at the leaf node because a selection bit is in a first state (select primary traffic). When the Primary Source tunnel is not functioning properly, the traffic from the Primary Source is dropped at the leaf node because a selection bit is toggled to a second state (select secondary traffic).

When the Primary Source tunnel is functioning properly, and a decision is made to switch the traffic to S-PMSI (based on some criteria), the Primary Source signals its intent to move the traffic from I-PMSI to S-PMSI. Since the Interface Index is the same for both the Primary Source I-PMSI tunnel and Primary Source S-PMSI tunnel, there is no need to store an additional Index for the Primary Source S-PMSI tunnel.

The various embodiments discussed herein provide efficient Source Redundancy implementations for, illustratively, S-PMSI based NG-MVPN solutions. In particular, the various embodiments provide some or all of the following advantages: (1) Fast Switchover from Primary Source to Secondary Source; (2) Lossless SPT switch from (*,G); and (3) Lossless I-PMSI to S-PMSI switch and vice versa.

As an example, consider a first scenario where a primary source PE (100) and a secondary source PE (200) are each in communication with a leaf node via I-PMSI, and a second scenario where the primary source PE (100) and secondary source PE (200) are each in communication with a leaf node via both I-PMSI and S-PMSI.

In the first scenario, the ILM and SG records at the leaf node reflects that there are only I-PMSI tunnels from Primary source PE and Secondary source PE, as follows:

ILM Records at Leaf
<I-PMSI-Primary, mvpn-X>: Interface Index 100
<I-PMSI-Secondary, mvpn-X>: Interface Index 200
SG Record at Leaf
<S,G>: RPF-Primary 100|RPF-Secondary 200

In the second scenario, the ILM and SG records at the leaf node reflects that there are both I-PMSI tunnels and S-PMSI tunnels from Primary source PE and Secondary source PE, as follows:

ILM Records at Leaf
<I-PMSI-Primary, mvpn-X>: Interface Index 100
<S-PMSI-Primary, mvpn-X>: Interface Index 100
<I-PMSI-Secondary, mvpn-X>: Interface Index 200
<S-PMSI-Secondary, mvpn-X>: Interface Index 200
SG Record at Leaf
<S,G>: RPF-Primary 100|RPF-Secondary 200

It is noted that in the second scenario, the ILM record for the I-PMSI and S-PMSI will result in the same index. Therefore, a transition from I-PMSI to S-PMSI would be lossless on primary tunnel as RPF since the primary is already programmed with the interface index. Similarly a transition for I-PMSI to S-PMSI on the secondary tunnel is also lossless as RPF-Secondary is already programmed with the interface index. Also in order to switch back from S-PMSI to I-PMSI, the SG record does not need to be updated as the interface indexes are the same.

Figure 3:
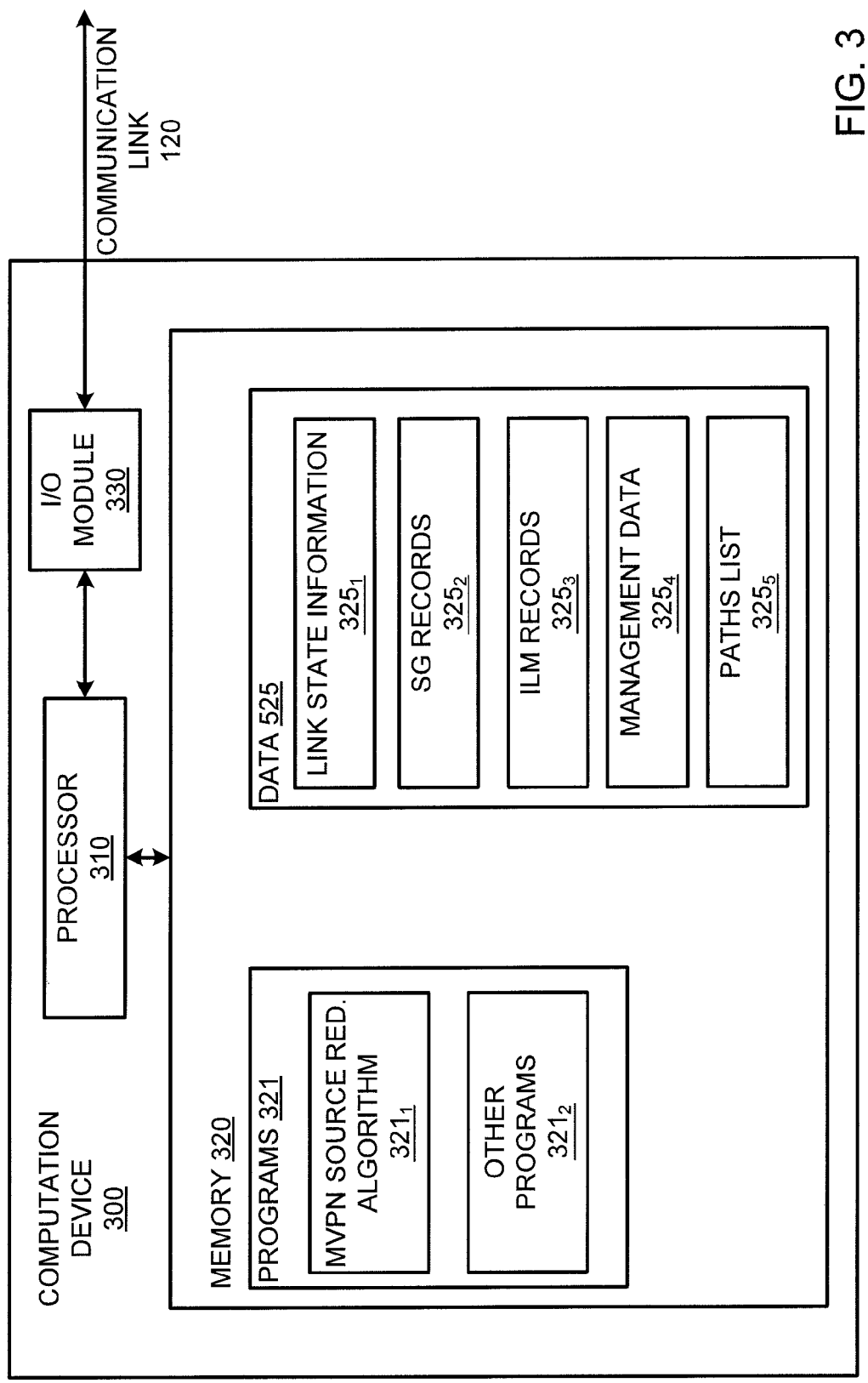
FIG. 3 depicts a high-level block diagram of a path computation device configured for performing an improved CSPF algorithm.

FIG. 3 depicts a high-level block diagram of a traffic flow management device configured for providing MVPN source redundancy such as with S-PMSI.

As depicted in FIG. 3, computation device 300 includes a processor 310, a memory 320, and an input-output (I/O) module 330, which are configured to cooperate for providing various functions depicted and described herein.

The I/O module 330 may support one or more interfaces to leaf nodes and/or devices via one or more associated communication links (e.g., via one or more of the communication links 120). For example, I/O module 330 may receive, via communication link 120, information suitable for use in executing a MVPN Source Redundancy Algorithm as well as various embodiments described herein. The I/O module 330 may support communication of any other suitable types of information.

The memory 320 includes programs 321 and data 325. The programs 321 include a MVPN Source Redundancy Algorithm $321_1$ (e.g., the method 200 of FIG. 2. The programs 321 may include any other necessary and/or desired programs. The data 325 includes link state information $325_1$, SG Records $325_2$, ILM Records $325_3$, Management Data $325_4$, and a paths list $325_5$. The data 325 may include any other necessary and/or desired data.

The processor 310 is configured for accessing memory 320 for providing various functions, e.g., accessing programs 321 from memory 320 in order to execute the programs 321, storing data and/or retrieving data from memory 320 (e.g., storing data received via the communication link 120, storing data produced during execution of programs 321, retrieving data for propagation via the communication link 120, and the like, as well as various combinations thereof). The processor 310 may provide and/or support any other capabilities for enabling operation of computation device 300 in accordance with the various embodiments.

As will be appreciated, computation device 300 of FIG. 3 is suitable for use as any leaf node or any of the nodes 110 depicted and described herein, as management system 130 depicted and described herein, or in any other manner necessary or desirable for providing capability according to the various embodiments in a communication network.

Although primarily depicted and described herein with respect to embodiments in which path and routing information is determined by leaf nodes or other nodes, it will be appreciated that in other embodiments path and routing information is determined by any suitable computation device (e.g., a management system or any other suitable device), such that any suitable computation device may perform the functions discussed herein with respect to the various embodiments.

Figure 4:
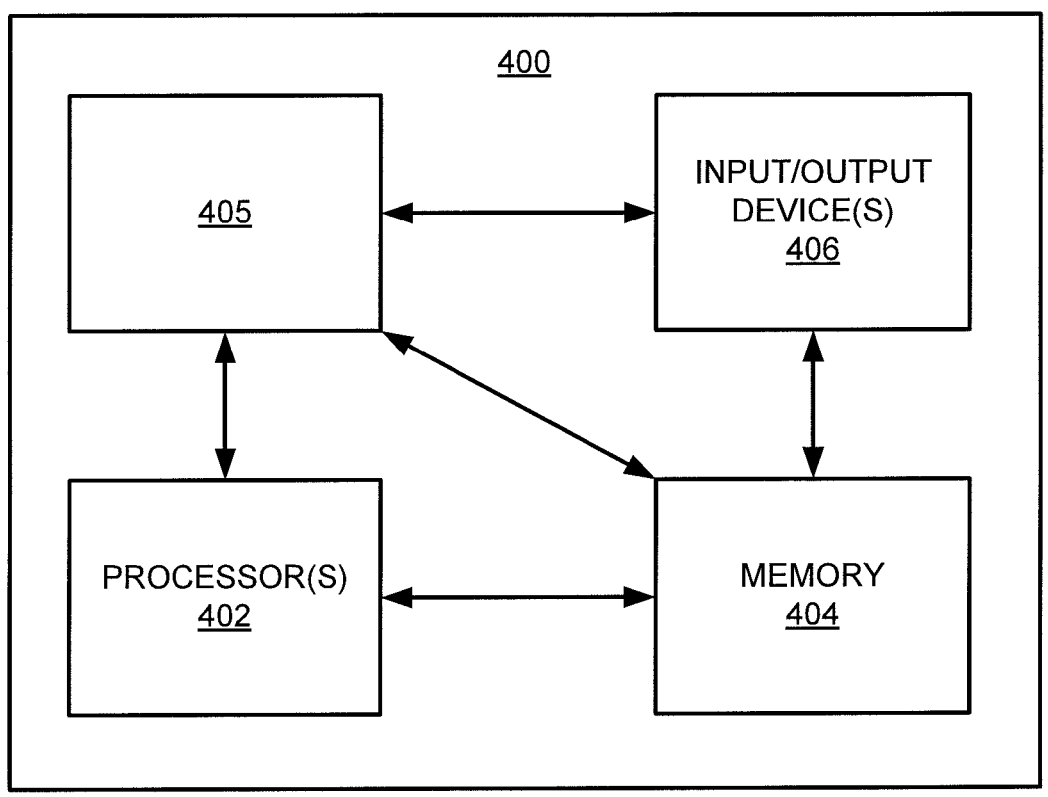
FIG. 4 depicts a high-level block diagram of a computer suitable for use in performing the functions described herein.

FIG. 4 depicts a high-level block diagram of a computer suitable for use in performing functions described herein.

As depicted in FIG. 4, computer 400 includes a processor element 402 (e.g., a central processing unit (CPU) and/or other suitable processor(s)), a memory 404 (e.g., random access memory (RAM), read only memory (ROM), and the like), an cooperating module/process 405, and various input/output devices 406 (e.g., a user input device such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like).

It will be appreciated that the functions depicted and described herein may be implemented in hardware or in software functions implemented by a hardware processor, e.g., using a general purpose computer, one or more application specific integrated circuits (ASIC), and/or any other hardware equivalents. In one embodiment, the cooperating process 405 can be loaded into memory 404 and executed by processor 402 to implement the functions as discussed herein. Thus, cooperating process 405 (including associated data structures) can be stored on a computer readable storage medium, e.g., RAM memory, magnetic or optical drive or diskette, and the like.

It is contemplated that some of the method steps discussed herein may be implemented within hardware, for example, as circuitry that cooperates with the processor to perform various method steps. Portions of the functions/elements described herein may be implemented as a computer program product wherein computer instructions, when processed by a computer, adapt the operation of the computer such that the methods and/or techniques described herein are invoked or otherwise provided. Instructions for invoking the inventive methods may be stored in tangible fixed or removable media, transmitted via a data stream in a tangible or intangible broadcast or other signal bearing medium, and/or stored within a memory within a computing device operating according to the instructions.

Generally speaking, computer hardware, software and/or firmware of the general architecture discussed herein may be replicated and used at each of a plurality of nodes or network elements or network management elements associated with a network. Moreover, such computer hardware, software and/or firmware at various locations, nodes, network elements or network management system elements may be operably communicating with each other to achieve the various steps, protocols, interactions and so on contemplated herein.

Although various embodiments which incorporate the teachings of the present invention have been shown and described in detail herein, those skilled in the art can readily devise many other varied embodiments that still incorporate these teachings.

What is claimed is:

1. A method for providing Multicast Virtual Private Network (MVPN) source redundancy, the method comprising:
    configuring a leaf node to use a first logical interface to receive data associated with a multicast channel from each of a Primary Source inclusive provider multicast service interface (I-PMSI) tunnel and a Primary Source selective provider multicast service interface (S-PMSI) tunnel; and
    configuring said leaf node to use a second logical interface to receive data associated with said multicast channel from each of a Secondary Source I-PMSI tunnel and a Secondary Source S-PMSI tunnel.

2. The method of claim 1, wherein each of said tunnels are associated with a respective Incoming Label Map (ILM) including an Interface Index representing a logical interface for receiving data, said configuring comprising:
    associating said first logical interface with the ILM Interface Index of the Primary Source I-PMSI tunnel and the ILM Interface Index of the Primary Source S-PMSI tunnel; and associating said second logical interface with the ILM Interface Index of the Secondary Source I-PMSI tunnel and the ILM Interface Index of the Secondary Source S-PMSI tunnel.

3. The method of claim 2, further comprising:
in response to a request to receive said multicast channel, programming an (S, G) record for said multicast channel as:
ILM Interface Index of the Primary Source as RPF-Primary index;
ILM Interface Index of the Secondary Source as RPF-Secondary index; and
ILM Interface Index of I-PMSI tunnel from Rendezvous Point (RP) as RPF-RP-Index.

4. The method of claim 2, further comprising:
communicating a Rendezvous Point (RP) I-PMSI Interface Index to PIM for use as an RPF-RP Index;
communicating a Primary Source ILM Interface Index to PIM for use as an RPF-Primary Index; and
communicating a Secondary Source ILM Interface Index to PIM for use as an RPF-Secondary Index.

5. The method of claim 1, further comprising:
in response to receiving a join indicative of intent to receive a specific MVPN channel, transmitting a join towards a rendezvous point (RP) node, and programming a source group (SG) entry associated with the MVPN channel as RPF-RP=Interface Index of I-PMSI FROM the RP node.

6. The method of claim 5, further comprising:
in response to learning a Primary Source PE node associated with the MVPN channel, transmitting a join towards the Primary Source PE node and programming a SG entry associated with the MVPN channel as RPF-Primary=Interface Index of I-PMSI from the Primary Source PE node.

7. The method of claim 6, further comprising:
in response to learning a Secondary Source PE node associated with the MVPN channel, transmitting a join towards the Secondary Source PE node and programming a SG entry associated with the MVPN channel as RPF-Secondary=Interface Index of I-PMSI from the Secondary Source PE node.

8. The method of claim 7, further comprising setting a flag to a first state to accept traffic from said Primary Source PE node and setting said flag to a second state to accept traffic from said Secondary Source PE node.

9. The method of claim 7, further comprising:
in response to receiving a S-PMSI switch message from said Primary Source PE node associated with the MVPN channel, programming a SG entry associated with the MVPN channel as RPF-Primary=Interface Index of P-PMSI from the Primary Source PE node.

10. The method of claim 1, wherein said leaf node has associated with it an Incoming Label Map (ILM) including an Interface Index common to each of a primary PE I-PMSI tunnel and a primary PE S-PMSI tunnel.

11. The method of claim 1, wherein said leaf node has associated with it an Incoming Label Map (ILM) including an Interface Index common to each of a secondary PE I-PMSI tunnel and a secondary PE S-PMSI tunnel.

12. The method of claim 1, wherein said leaf node has associated with it an Incoming Label Map (ILM) including an Interface Index common to each of a primary PE I-PMSI tunnel and a secondary PE I-PMSI tunnel.

13. The method of claim 1, wherein said leaf node has associated with it an Incoming Label Map (ILM) including an Interface Index common to each of a primary PE S-PMSI tunnel and a secondary PE S-PMSI tunnel.

14. The method of claim 1, wherein said leaf node comprises a label switching routers (LSRs) operating according to Multi-Protocol Label Switching (MPLS) Label Distribution Protocol (LDP).

15. The method of claim 1, wherein path and routing information is determined by one or more of said leaf node, another leaf node and a management system.

16. An apparatus for providing Multicast Virtual Private Network (MVPN) source redundancy, the apparatus comprising:
a processor configured for:
configuring a leaf node to use a first logical interface to receive data associated with a multicast channel from each of a Primary Source inclusive provider multicast service interface (I-PMSI) tunnel and a Primary Source selective provider multicast service interface (S-PMSI) tunnel; and
configuring said leaf node to use a second logical interface to receive data associated with said multicast channel from each of a Secondary Source I-PMSI tunnel and a Secondary Source S-PMSI tunnel.

17. A non-transitory computer readable storage medium storing instructions which, when executed by a computer, cause the computer to perform a method for providing Multicast Virtual Private Network (MVPN) source redundancy, the method comprising:
configuring a leaf node to use a first logical interface to receive data associated with a multicast channel from each of a Primary Source inclusive provider multicast service interface (I-PMSI) tunnel and a Primary Source selective provider multicast service interface (S-PMSI) tunnel; and
configuring said leaf node to use a second logical interface to receive data associated with said multicast channel from each of a Secondary Source I-PMSI tunnel and a Secondary Source S-PMSI tunnel.

18. The non-transitory computer readable storage medium of claim 17, wherein each of said tunnels are associated with a respective Incoming Label Map (ILM) including an Interface Index representing a logical interface for receiving data, said configuring comprising:
associating said first logical interface with the ILM Interface Index of the Primary Source I-PMSI tunnel and the ILM Interface Index of the Primary Source S-PMSI tunnel; and
associating said second logical interface with the ILM Interface Index of the Secondary Source I-PMSI tunnel and the ILM Interface Index of the Secondary Source S-PMSI tunnel.

19. A computer program product wherein computer instructions, when processed by a computer, cause the computer to perform a method for a providing Multicast Virtual Private Network (MVPN) source redundancy, the method comprising:
configuring a leaf node to use a first logical interface to receive data associated with a multicast channel from each of a Primary Source inclusive provider multicast service interface (I-PMSI) tunnel and a Primary Source selective provider multicast service interface (S-PMSI) tunnel; and configuring said leaf node to use a second logical interface to receive data associated with said multicast channel from each of a Secondary Source I-PMSI tunnel and a Secondary Source S-PMSI tunnel.

* * * * *